United States Patent [19]

McGill

[11] Patent Number: 5,436,886
[45] Date of Patent: Jul. 25, 1995

[54] ATM SWITCH IN DUAL SWITCH PLANE OPERATION

[75] Inventor: Richard T. McGill, Nepean, Canada

[73] Assignee: Northern Telecom Limited, Montreal, Canada

[21] Appl. No.: 275,170

[22] Filed: Jul. 14, 1994

[51] Int. Cl.6 .............................................. H04L 1/22
[52] U.S. Cl. ...................................... 370/16; 370/60; 370/60.1
[58] Field of Search ................... 370/60, 16, 13, 60.1, 370/14, 61, 58.1-58.3, 94.1, 94.2; 340/825.01, 827, 825.06, 825.51, 825.52, 825.8, 825.79

[56] References Cited

U.S. PATENT DOCUMENTS

| | | | |
|---|---|---|---|
| 5,072,440 | 12/1991 | Isono et al. | 370/60 |
| 5,103,220 | 4/1992 | Brunle | 370/16 |
| 5,153,578 | 10/1992 | Izawa et al. | 370/825.21 |
| 5,229,990 | 7/1993 | Teraslinna | 370/16 |
| 5,274,633 | 12/1993 | Kato et al. | 370/60 |
| 5,283,782 | 2/1994 | Takase et al. | 370/16 |
| 5,285,441 | 2/1994 | Bansal et al. | 370/16 |

FOREIGN PATENT DOCUMENTS

| | | |
|---|---|---|
| 0359352 | 3/1990 | European Pat. Off. |
| 0505601 | 9/1992 | European Pat. Off. |
| 4023937 | 1/1992 | Germany |
| 94/11973 | 5/1994 | WIPO |

OTHER PUBLICATIONS

"The ATM Switch Concept and the ATM Pipe Switch" by M. Larsson et al, Ericsson Review, vol. 70, No. 1, pp. 12-20, Stockholm, Sweden, 1993.

Primary Examiner—Douglas W. Olms
Assistant Examiner—Ajit Patel
Attorney, Agent, or Firm—Yoshiharu Toyooka

[57] ABSTRACT

A novel ATM switch of dual switch plane operation and method of switching traffic in unit cells among ports in dual switch planes are disclosed. The ATM switch of the invention is plane protected in that a redundant switch plane is provided. In the switch, traffic cells are tagged either symmetric or asymmetric at an ingress port so that a destination port is able to properly gather correct cells even when switch planes develop faults or quality degradation.

12 Claims, 12 Drawing Sheets

ATM SWITCH IN DUAL SWITCH PLANE OPERATION

FIELD OF THE INVENTION

The present invention relates generally to an ATM switching network and, in particular, it is directed to such an ATM switching network which utilizes the dual plane mode of operation for better reliability and maintainability.

BACKGROUND OF THE INVENTION

As telephone switching systems are required to work non-stop, 24 hours a day, they must comprise the most reliable components, arranged in the most efficient manner possible. However, the use of highly reliable components alone is not enough to guarantee that breakdowns will not occur. Various ways of achieving high reliability and maintainability of telecommunication switching systems have been in existence. Among many schemes, the dual synchronous matched scheme (dual plane operation) has proven very successful.

While this scheme is fairly routine in TDM switching, it has not been adapted for message switching or computing except in specialized cases. The following patents provide some examples. U.S. Pat. No. 5,274,633, issued Dec. 28, 1993 to Kato et al describes an ATM dual switch system in which cells identified in the header are sent either to an active or standby switch. A controller at the output selects the correct cells for output transmission. U.S. Pat. No. 5,153,578, issued Oct. 6, 1992 to Izawa et al teaches an apparatus and method for establishing identical data in a dual ATM switch. It is concerned with synchronization between an active and standby switch. Dummy cells are inserted according to a difference in the cell count between the two switches so that a proper synchronization can be effected at the output. U.S. Pat. No. 5,072,440, issued Dec. 10, 1991 to Isono et al describes ATM switches which include dual self-routing switches and conversion modules to select between an active and a standby switch. The patent is specifically directed to a technique of determining whether or not all cells have been discharged from the active switch before an actual switchover. European Patent No. 0 359 352, published on Mar. 21, 1990 (Chopping et al), is directed to a synchronous switch network of dual plane operation. The patent ensures the reliability of the network by "Scissors Crossover", where data streams are distributed to two planes at each stage, e.g. at line termination, switch, and transmission. U.S. Pat. No. 5,285,441, issued Feb. 8, 1994 to Bansal et al, on the other hand, describes a line protection technique in an ATM switch. The technique is concerned with errorless switching between active and standby lines. A controllable amount of time delay is introduced in one of two channels connecting the lines and a switching means in the form of RAM. Leading data is directed into the line with the time delay and lagging data into the other, and errorless switching is conducted after a proper time delay is effected to the leading data.

The present invention addresses difficulties associated with ATM switches which operate in dual switch planes for the purpose of better reliability and maintainability. Specifically, in known dual plane switches even a single fault in one link would bring down the entire plane, even though remaining links from other ports in the same plane may be functioning normally. It is also common that the time delay of cell transmission through each plane is different from each other due to link length, processing time of cells or various other factors. Furthermore, transmission errors may cause infinite delay, that is to say, an identical cell may not appear at all in the other plane. However, it is necessary that the two planes of the prior art system work in close synchrony or within a tolerable range of deviation from a predetermined time delay difference so that cells can be properly aligned between the two planes. Otherwise, cells may be duplicated, wrongly discarded or misordered. The present invention realizes an ATM switch which withstands multiple faults in the system, unless the faults occur in links in both planes between one port and the switch fabric. The switch of the present invention requires no strict synchronization between planes. In particular, the invention utilizes the concept of symmetric and asymmetric traffic, both composed in unit cells so that cells at the destination are correctly gathered even when faults or degradation occurs in links in switch planes.

OBJECTS OF THE INVENTION

It is therefore an object of the invention to provide a technique of switching traffic in unit cells among ports in dual plane operation.

It is another object of the invention to provide an ATM switch which operates dual switch planes and uses cells tagged either symmetric or asymmetric.

It is yet an object of the invention to provide method of switching in unit cells among ports using cells tagged either symmetric or asymmetric.

It is a further object of the invention to provide a technique of switching traffic in unit cells among ports using an alarm in response to a fault in a link so that cells are tagged either symmetric or asymmetric.

It is an additional object of the invention to provide a technique of switching traffic among ports in unit cells that are tagged either symmetric or asymmetric and to provide flow control so that no cells will be lost due to cell collision.

It is still a further object of the invention to provide a technique of switching traffic among ports in unit cells that are tagged either symmetric or asymmetric, and selecting a preferred plane of operation in response to a control signal from a controller without cell loss during a switchover.

SUMMARY OF THE INVENTION

Briefly stated, the invention is directed to an ATM switch of dual plane operation for exchanging cells among a plurality of bidirectional ports through a first and a second switch plane. Each of the plurality of bidirectional ports is connected to a plurality of linecards to receive the cells therefrom and transmit the cells thereto. The ATM switch comprises a first and a second switch fabric connected to the plurality of bidirectional ports for transferring the cells among bidirectional ports. The first switch fabric is in the first switch plane and the second switch fabric is in the second switch plane. Each of the bidirectional ports has tagging means for tagging each cell either symmetric or asymmetric and includes transmitting means for transmitting symmetric cells to both switch fabrics and asymmetric cells to only one of the two switch fabrics. Each of the plurality of ports also has receiving means for accepting symmetric cells from one of the two switch fabrics and asymmetric cells from either one of the two switch fabrics.

According to another aspect, the invention provides a method of exchanging ATM cells among a plurality of bidirectional ports by way of a first switch fabric in a first switch plane, and a second switch fabric in a second switch plane. The method comprises a step of each of the plurality of bidirectional ports receiving the cells from a plurality of linecards and transmitting the cells thereto. The method further includes steps of each of the plurality of bidirectional ports tagging each cell either symmetric or asymmetric and transmitting symmetric cells to the switch fabric in both switch planes and asymmetric cells to the switch fabric in only one of the two switch planes. The method includes an additional step of each of the bidirectional ports accepting symmetric cells from the switch fabric in one of the two switch planes and asymmetric cells from the switch fabrics in either of the two switch planes.

DETAILED DESCRIPTION OF THE PREFERRED EMBODIMENTS OF THE INVENTION

Figure 1:
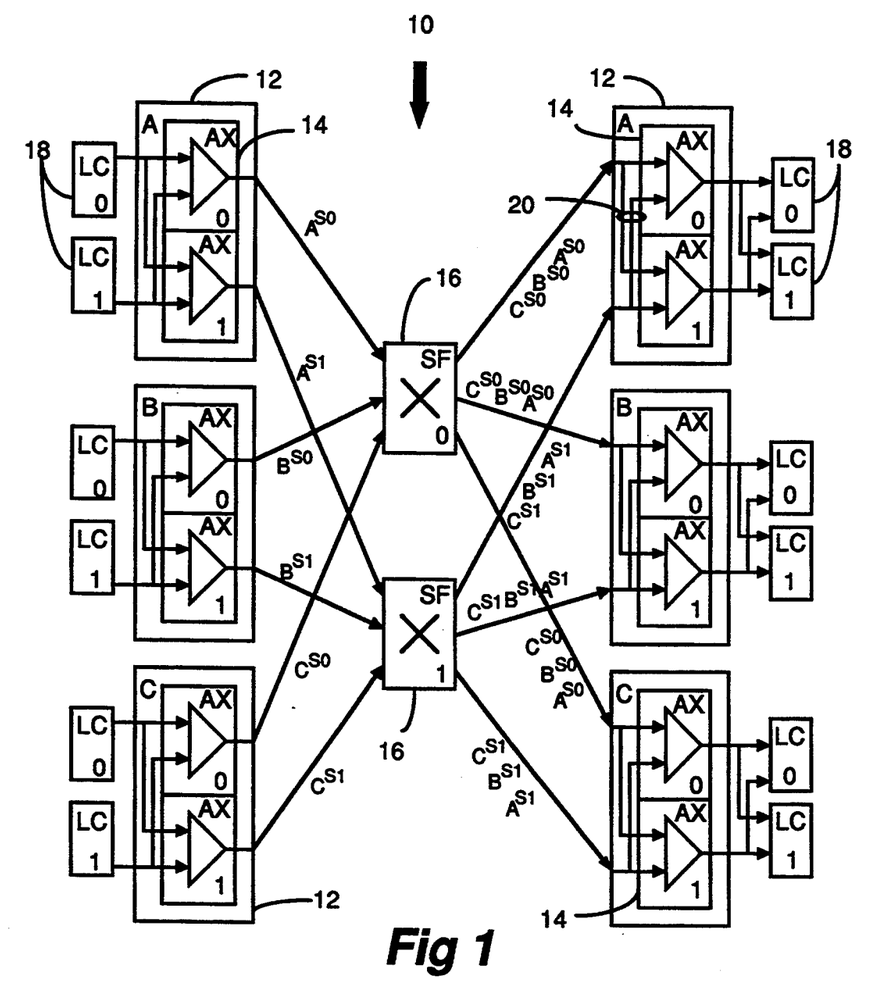
FIG. 1 is a schematic illustration of an ATM switch in dual switch plane operation according to the invention.

FIG. 1 shows an unfolded view of an ATM switch 10 in the dual plane mode of operation, according to one embodiment of the present invention. The switch has 16 (or some other number) ports 12, of which only three ports labeled A, B and C are shown in the figure. In this embodiment, each port handles, for example, 600 Mb/s of bandwidth. The switch is fully redundant in that each port has redundant multiplexers (AX) 14 denoted AX0 and AX1 and the switch fabric 16 is also redundant, consisting of switch fabrics labeled SF0 in one switch plane and SF1 in another. Any number of linecards 18 can be attached to each port but must have an aggregate bandwidth of 600 Mb/s. Each linecard is also protected by pair (1+1) redundancy. The figure shows one protected pair of linecards attached to each port and the pair are labeled LC0 and LC1.

The connection between linecards and multiplexers is full crossover on ingress and egress, that is to say, it is a point-to-2-point in both directions. Therefore on ingress, LC0 is connected to both AX0 and AX1, as is LC1 to both AX0 and AX1. Each multiplexer can then choose either linecard to take traffic therefrom on ingress. The connection from multiplexer to switch fabric is point-to-point by e.g. a fiber optic link. Thus SF0 receives traffic from the AX0 of all ports. SF1 receives traffic from the AX1 of all ports. On egress, the connection from switch fabric to multiplexer is also a point-to-point fiber optic link. SF0 transmits directly to the AX0 of all ports and SF1 to the AX1 of all ports. Thus the AX0 of a port sends cells to and receives cells from SF0. This switch plane is called switch plane 0. Similarly, the AX1 of a port sends cells to and receives cells from SF1. This is switch plane 1. In the description which follows below, designations of "local plane" and "mate plane" are also used. For AX0, switch plane 0 is the local plane and switch plane 1 is the mate plane. For AX1, on the other hand, switch plane 1 is the local plane and the other is the mate. Furthermore, the traffic is regenerated from the switch fabrics to the mate multiplexer via a copper passthrough bus 20 between the multiplexers, e.g. AX0 and AX1. Thus each multiplexer can receive traffic from either plane. As the connection between multiplexers and linecards is full crossover on ingress as well as on egress, the traffic from each multiplexer can be sent to either linecard on egress.

The operation of the switch will now be described by using the concept of symmetric and asymmetric traffic. Symmetric traffic is that which originates from a port and is sent to both switch planes. Asymmetric traffic is that which originates from a port and is sent to one switch plane only.

Symmetric Operation

Figure 2:
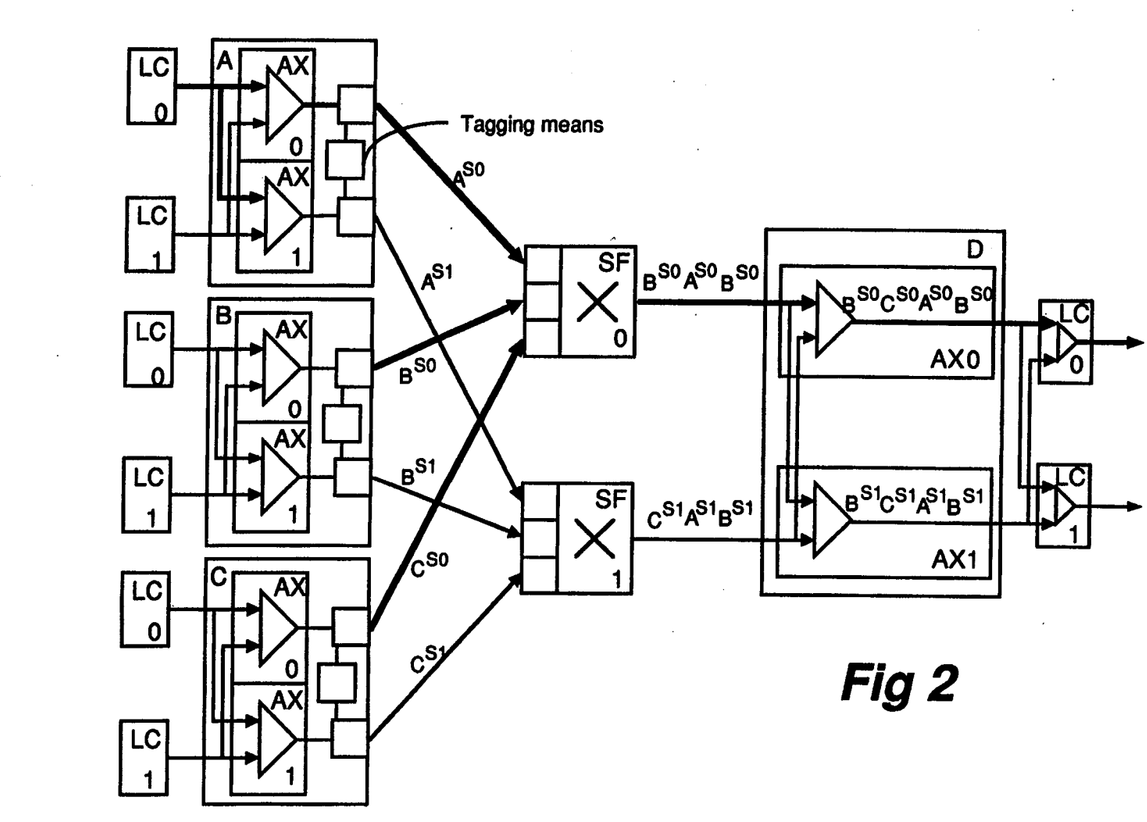
FIG. 2 is a schematic illustration of normal operation of the ATM switch in dual switch planes according to the invention.

FIG. 2 shows the switch in normal operating mode. The figure shows three ingress ports, A, B, & C focusing traffic on port D. Port D can be any egress port and it could be port A, B or C. In this figure and other figures of the disclosure, the traffic in unit cells such as ATM cells is denoted by a letter of the port from which it was sent. There is a superscript on each cell denoting that the cell is a symmetric or asymmetric cell (S=Symmetric; A=Asymmetric) and that the cell is sent to SF0 or SF1 (0=Cell to switch plane 0; 1=Cell to switch plane 1). Each port selects at any one time one of the linecard pair as a preferred linecard to and from which it sends and takes data traffic. Assuming that LC0 is its preferred linecard, port A on ingress receives data traffic from LC0 at AX0 and the identical traffic from LC0 at AX1. Therefore all data traffic is sent to both planes. However, on egress, port D also selects one of the two switch planes as a preferred plane from which its preferred linecard takes the traffic. The preferred plane is alternatively called a working plane; the other plane is a protection plane or standby plane. In this example, as described above, AX0 and AX1 take traffic from LC0 on ingress but each sends it to its local plane, i.e. AX0 to SF0 (switch plane 0), and AX1 to SF1 (switch plane 1). As the same traffic is taken from one linecard LC0 and sent to both planes, it is tagged symmetric, as shown in FIG. 2. While in the accompanying figures cells are identified by either number 0 or 1, to which plane they are sent, actual tagging information only indicates whether it is symmetric or asymmetric. Port D receives identical traffic from SF0 at AX0 and from SF1 at AX1. The traffic paths from the preferred linecard or in the working plane are shown by a thicker line. In this normal operation, SF0 and SF1 receive the same traffic and the egress port D also receives the same traffic at its two multiplexers. Selection at port D of either linecard or either plane would have no impact, however, as will be described later, various criteria are used for selecting the preferred linecard and working plane at the egress port.

Asymmetric Operation

Figure 3:
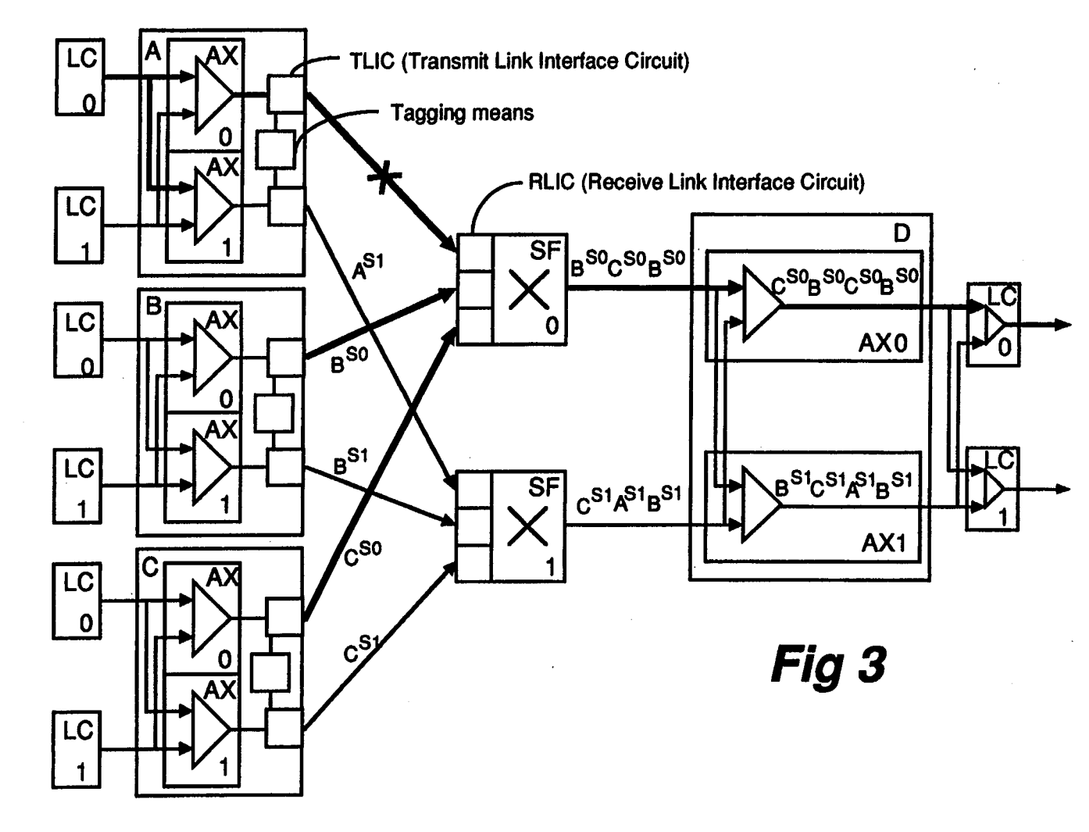
FIG. 3 is a schematic illustration of operation of the ATM switch when a fault occurs in one link.

Referring to FIG. 3, if an ingress port sends a cell to only one switch fabric, it tags the cell asymmetric. Asymmetric traffic is used when there is a failure on the ingress path. This may be a failure in the ingress multiplexer, the switch fabric or the fiber optic link between the multiplexer and switch fabric. Most likely, the failure would exist in the fiber optic link which is very susceptible to laser degrades and failures. As in known systems, a fiber optic link between a port and a switch fabric is provided with a TLIC (transmit link interface circuit) at the transmitter side and RLIC (receive link interface circuit) at the receiver side. Because the link is bidirectional, a pair of TLIC and RLIC are connected by a pair of fiber optics. The interface circuits are required for electrical/optical signal conversion, framing as well as line coding conversion in addition to other control functions such as transmission and reception of flow control signals. One of the flow control functions is to generate flow control or alarm signals. When RLIC does not receive a signal due to link failure etc., an indication (later referred to as FERF—far end receive failure) is sent to the transmitting port by the link in the opposite direction. According to the invention, if the plane suffers a hard fault such as a link failure, e.g. LOS (loss of signal), LOF (loss of frame), the egress port will instantly switch to the protection plane. FIG. 3 shows a break in an ingress data path. It is shown as a break in the ingress fiber optic link from port A AX0 to SF0. The effect of this is that SF0 receives traffic from ports B and C but not from port A. No corrective actions have yet been taken and cells to SF1 are still marked symmetric. Since LC0 is the preferred linecard of port D, port D will not output all the required cells unless LC1 becomes the preferred linecard.

Figure 4:
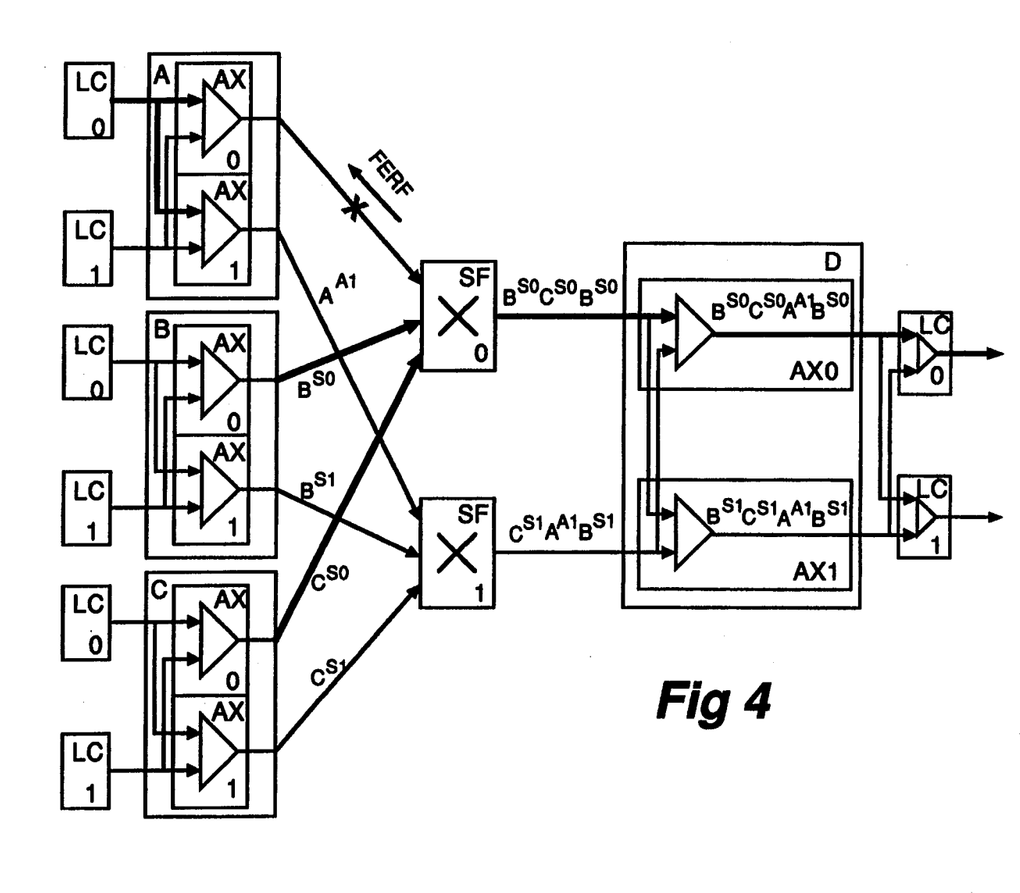
FIG. 4 is a schematic illustration of a correctional action taken by the ATM switch.

FIG. 4 shows the corrective actions taken by the switch to remedy the problem, according to one embodiment of the invention. If there is a failure on an ingress path, the mate multiplexer tags its ingress traffic as asymmetric. The original multiplexer stops sending traffic. Each multiplexer is designed such that on egress it takes symmetric traffic from the respective local plane and asymmetric traffic from both planes. Thus, regardless of which is its local plane, each egress multiplexer takes a cell marked asymmetric from both planes. Referring further to the figure, SF0 detects a problem when it is no longer receiving any traffic from port A. It alerts port A by sending an alarm called Far End Receive Failure (FERF). A FERF indication is sent to port A AX0 from SF0 on its egress fiber optic link. When port A AX0 receives the FERF indication, it signals its mate AX1 to start transmitting its traffic by tagging it asymmetric. Port A AX0 can then stop transmitting traffic and go into a diagnostic mode. In FIG. 4, the traffic from port A AX1 is being tagged asymmetric. SF0 is still receiving traffic only from ports B and C. SF1 is receiving traffic from ports A, B, and C. Even though egress port D AX0 is receiving traffic from SF0, it also takes asymmetric traffic from SF1, that is, the asymmetric traffic from port A which is routed through SF1 is merged with the traffic from SF0. LC0 at port D is the preferred linecard and sends correct cells at its output.

Figure 5:
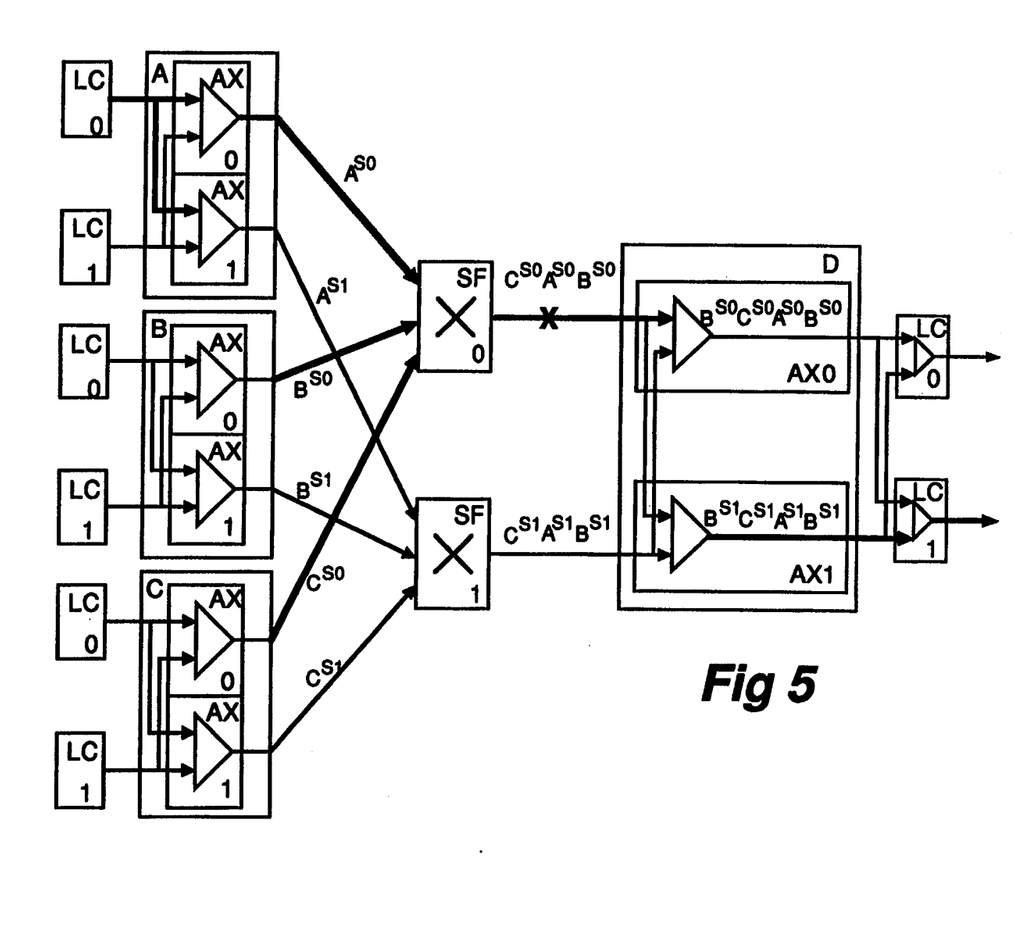
FIG. 5 is a schematic illustration of operation of the ATM switch when a fault occurs in the fiber optic egress link.

A link fault on the egress between the switch fabric and the multiplexer requires no FERF and does not involve a change of tagging cells to asymmetric as the egress multiplexer recognizes instantly that it has stopped receiving traffic from the switch fabric. FIG. 5 illustrates such a case. A break in an egress link stops transmission of cells to the AX0 of port D. Port D detects a break in transmission and immediately switches to the protection linecard LCI which takes cells from AX1 for output. A monitor on the link detects loss of transmission and a real time controller switches the linecard in response to the monitor signal. The monitors and the real time controller will be described in detail later in connection with FIG. 9. All cells in ingress traffic, even those from port D whose egress link developed a fault, are maintained as symmetric. Now AX0 and LC0 can be taken out of the system for diagnosis.

Figure 6:
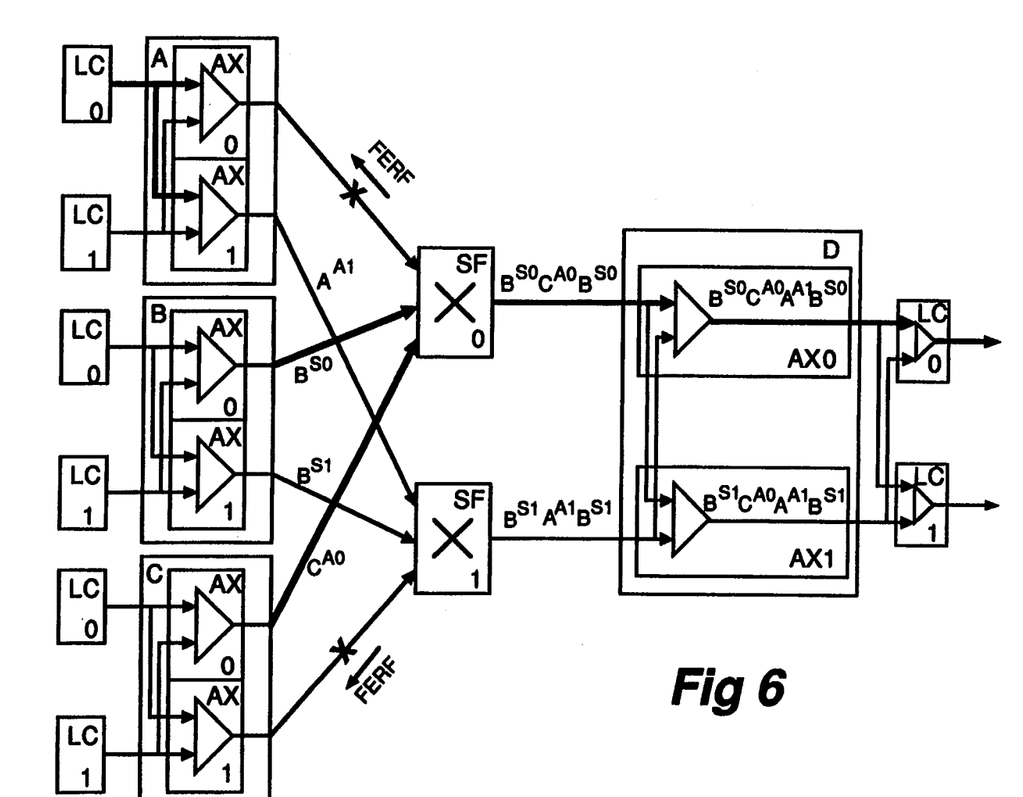
FIG. 6 is a schematic illustration of a correctional action taken by the ATM switch when more than one fault occurs in the links.

FIG. 6 shows the ability of the switch to withstand multiple ingress faults. In the figure, there is a fault in the ingress link between port A AX0 and SF0. There is also a second fault in the ingress link between port C AX1 and SF1. Here, SF0 detects the ingress failure from port A and send FERF to it. Similarly, SF1 detects the ingress failure from port C and send FERF to it. Port A will start tagging its traffic from AX1 asymmetric. Port C will start tagging its traffic from AX0 asymmetric. Now, SF0 receives traffic from ports B and C. SF1 receives traffic from ports A and B. In this case, neither switch fabric receives all the traffic. Port D therefore receives at AX0 on its local plane symmetric traffic from port B. It also detects asymmetric traffic from both planes, that is to say, asymmetric traffic from port C on its local plane and asymmetric traffic from port A via SF1 on its mate plane. Port D AX0 will then merge them in its outgoing stream. Likewise, AX1 receives symmetric traffic from port B and asymmetric traffic from port A, both on its local plane, but it also takes in asymmetric traffic from Port C on its mate plane. As a result, both multiplexers send out to respective linecards identical traffic which may be potentially skewed in time. Because LC0 is the preferred linecard of port D, it sends out correct cells in its output link.

Figure 7:
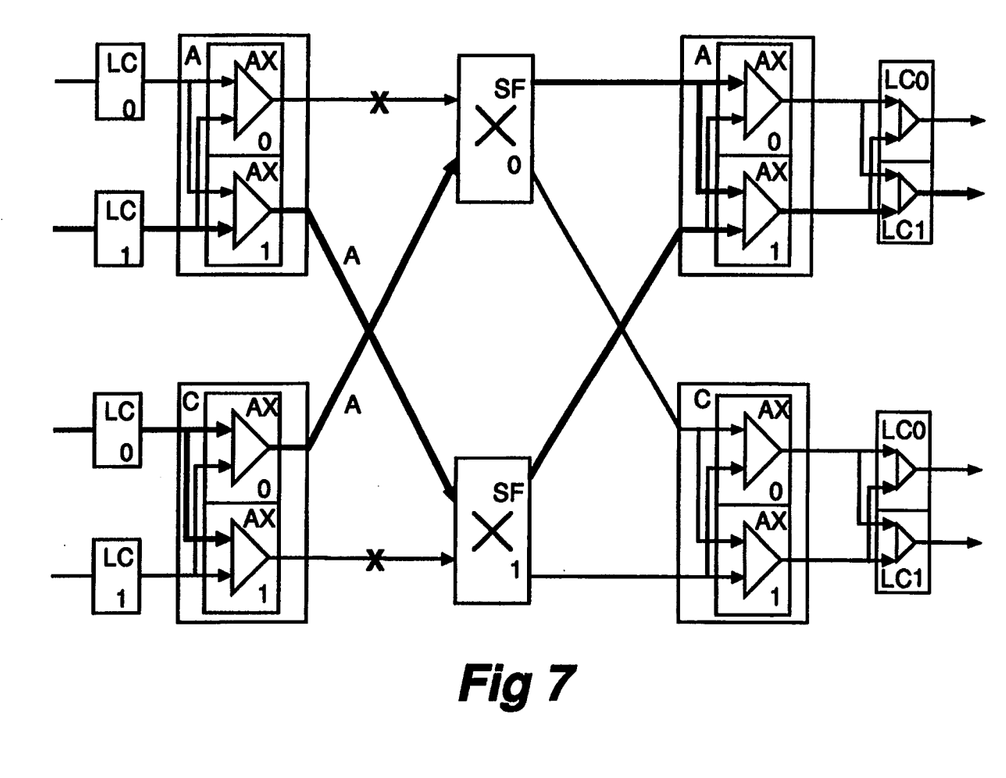
FIG. 7 depicts a schematic illustration of correctional actions taken by the ATM switch at ports whose ingress links have developed faults.

Thus far, the above description has been concerned with traffic from ports A, B and C to port D when faults develop in ingress fiber optic links from port A and C or when a fault occurs in the egress link to port D. It is possible that, because the switch is fully bidirectional, traffic flows from port A to port A via switch fabrics and faults may occur in that path. FIG. 7 depicts the same scenario as in FIG. 6, but showing ports A and C at ingress and egress. As in the case of FIG. 6, when faults are detected on ingress links, FERFs are sent to ports A and C which immediately start tagging cells asymmetric and send such cells to respective switch fabrics. Port A on egress now switches over to the protective linecard LC1 which takes traffic from AX1. Port A AX1 is also receiving traffic from port C. The path of the traffic is shown in thicker lines. Ingress AX0 and egress AX0 of a port are generally on the same card as LC0s on ingress and egress. As shown in FIG. 7, port A AX0 on ingress and AX0 on egress have been safely isolated and can now be taken out of the system for repair. The same description applies to the ingress fault at port C.

Figure 8:
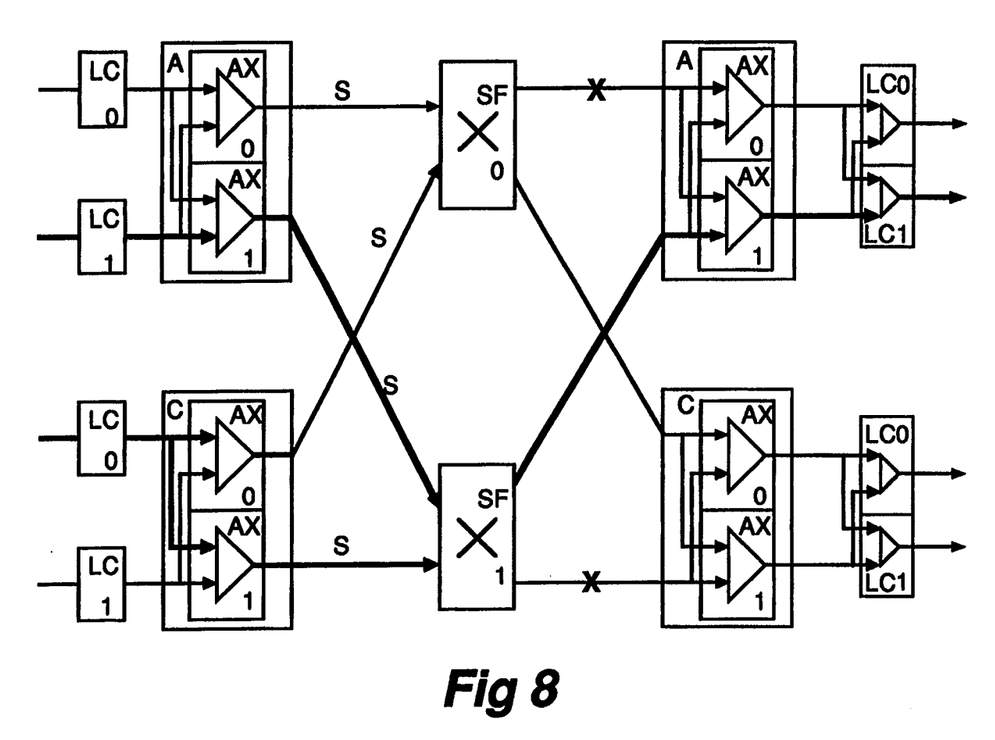
FIG. 8 is a schematic illustration of correctional actions taken by the ATM switch at ports whose egress links have developed faults.

FIG. 8 illustrates ports A and C when multiple faults occur in their egress links. Because, as mentioned above in connection with FIG. 4, no FERF indications are sent to the ingress source, ports A and C keep transmitting cells tagged symmetric to both switch fabrics. However, Port A on egress immediately switches over to AX1 which takes symmetric traffic from SF1 because SF1 is its local plane. SF1 in turn is receiving complete traffic from ports A and C. Likewise, after switchover port C takes traffic from SF0 which is also receiving complete traffic from ports A and C.

Figure 9:
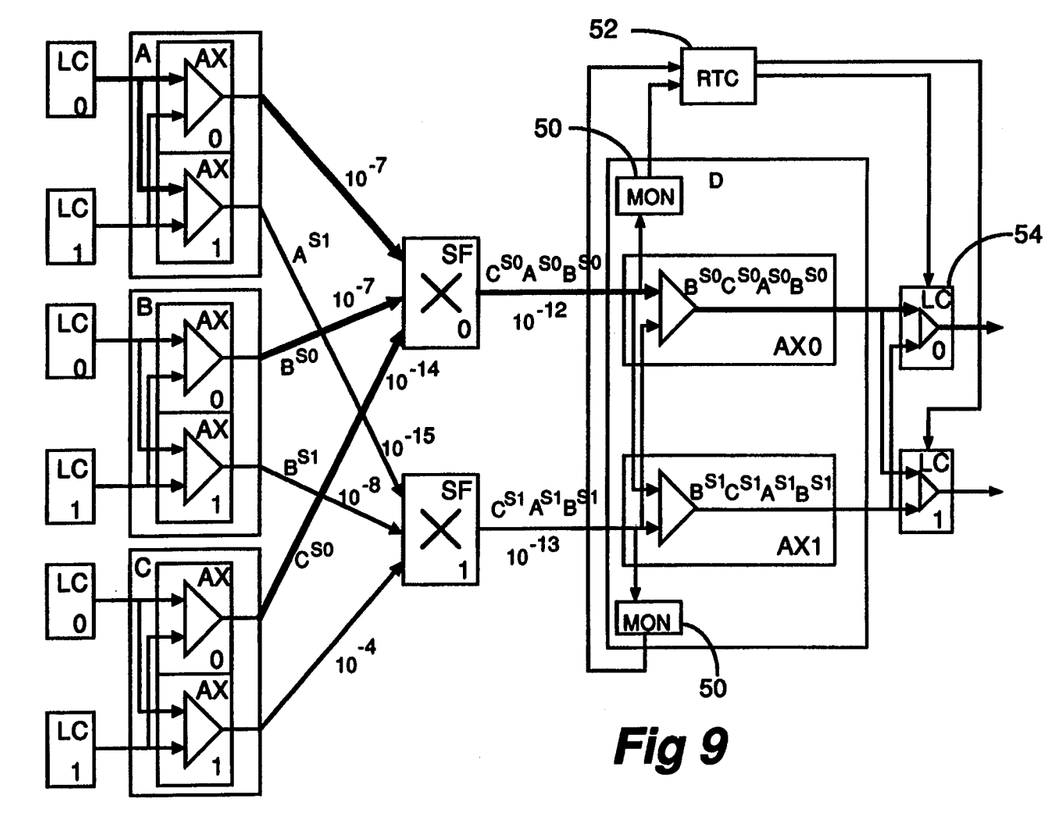
FIG. 9 is a schematic illustration of a traffic monitoring operation of the ATM switch.

FIG. 9 shows plane selection and monitoring. Multiplexers take asymmetric traffic from both planes and symmetric traffic from their respective local planes. This ensures that both multiplexers are handling sufficient and identical cells. However, because the quality of transmission on both planes may differ, an egress port, e.g. port D in FIG. 9, will have one switch plane as a preferred or working plane from which its preferred linecard takes traffic. In this embodiment, the criteria used to select the working switch plane and preferred linecard is the least errored cells received over a fixed interval from both planes. This is monitored at monitor 50 which checks the integrity of cells and counts the number of good cells. This information is passed along to the RTC (real time controller) 52. Similar monitors are located on ingress links between switch fabrics and multiplexers, but they are not shown in the drawings for the sake of clarity. Thus the RTC obtains similar information about degrades and failures in all links from these monitors. It then determines which switch plane and linecard should be chosen as preferred and directs a selection MUX 54.

FIG. 9 also illustrates a case where other criteria must be employed for preferred plane selection. A number of degraded ingress links are shown. Links are degraded to values shown in the figure in BER (bit error rate). At a port, transmission performance is measured for each plane by:

[(egress link performance)+Σ(performance of all ingress links)].

The real time controller (RTC) collects information on the Bit Error Rates (BER) of all the links. The RTC will then use this information to select the preferred plane and programs all the multiplexers to switch to it. In this way, the system is protected against soft faults in the planes. Choosing a new preferred switch plane every couple of seconds is not recommended since switching between planes causes a hit (replication or omission) on traffic.

It is possible that traffic from both switch fabrics converges to one port for a certain period. Port congestion messaging for the purpose of flow control is used to resolve the possibility of having up to 1.2 Gb/s of traffic focusing at a port which is only able to pass 600 Mb/s through its data pipe. This event may arise if the sum total of symmetric and asymmetric traffic focusing at a port is greater than 600 Mb/s. Note that symmetric traffic focusing at a port can never exceed 600 Mb/s. Thus, the only time flow control is necessary is when there is asymmetric traffic.

Figure 10:
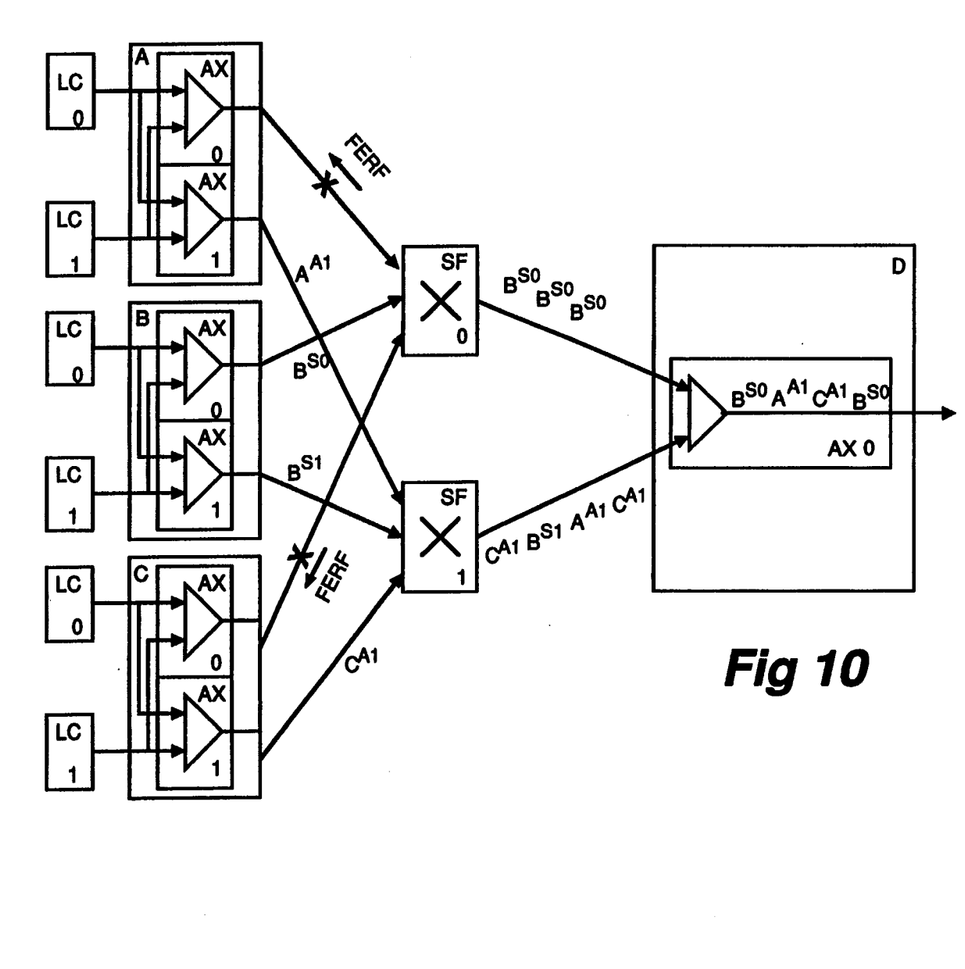
FIG. 10 is a schematic illustration of an operation of the ATM switch, showing that congestion control is needed under certain circumstances.

FIG. 10 shows one example of the need for port congestion messaging. In the figure there are two faults, both in switch plane 0, and as a result a large amount of asymmetric traffic flows through SF1. SF0 only receives symmetric traffic from port B. At a peak instant or interval, the symmetric traffic from SF0 (from port B) and the asymmetric traffic from SF1 (from ports A and C) could be greater than 600 Mb/s. Congestion control is required.

Figure 11:
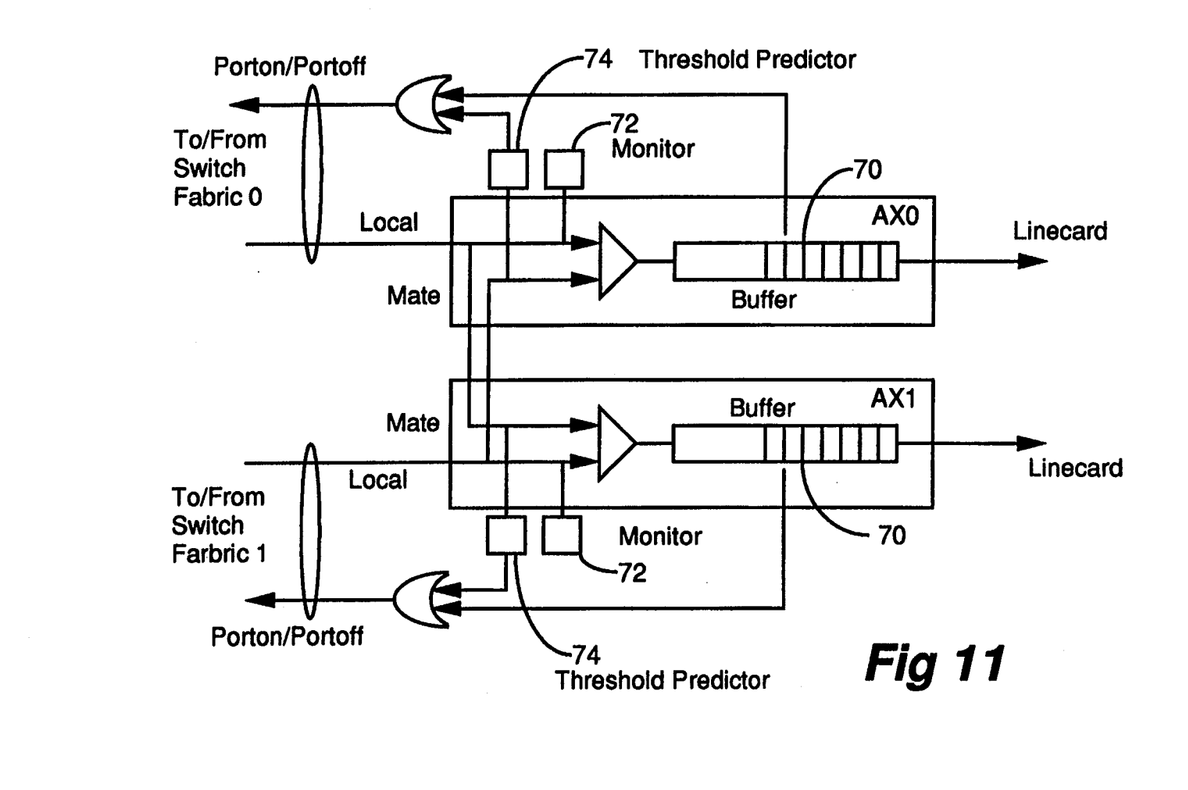
FIG. 11 is a schematic illustration of the flow control mechanism according to the invention.

FIG. 11 shows the congestion control mechanism at the multiplexers AX0 and AX1. Each multiplexer has a 3-port RAM 70 serving as a queuing buffer that can handle two writes and one read in a cycle. As described earlier, a monitor 72 measures least errored cells in its local plane at each multiplexer. When the buffer exceeds a certain threshold, or the mate plane threshold predictor 74 indicates that the respective buffer in the mate plane is at a threshold, PORTOFF messages are sent with each cell back to the switch fabric in the local plane. When the buffer is below its threshold, PORTON messages are sent with each cell back to the switch fabric. The mate plane threshold predictor 74 predicts the fill state of the buffer in the mate plane by monitoring the traffic on the crossover bus from the mate plane. This is necessary due to the delay difference through each plane. Each multiplexer must control the flow in its local plane when either buffer reaches its threshold. This prevents traffic jitter generation which could result if the flow is controlled in only one port. An alternate to the predictor is a cross coupling of the thresholds between multiplexers. However, a single fault would cause a catastrophic failure. In this embodiment, the buffer is set at 32 cells but the size should be 2×(number of cells round-trip delay in fiber link+number of cells processing time in switch fabric+number of cells margin). This ensures a 100% link utilization.

It should also be noted that an ATM switch, like any other communications equipment, will go on maintenance procedures. In dual plane switches, each plane is tested and maintained by a controlled switchover which forces all traffic to the other plane. This is achieved by marking asymmetric traffic at the source using the same methodology as for fault recovery. It is performed in a hitless manner at the source AX since synchronization of all tagging occurs at a common point which is unencumbered by buffering or transmission delay variability. The RTC in FIG. 9 coordinates the plane switchover by informing each port's AX to mark its traffic as asymmetric on the same plane. Once the buffers at the mate plane have drained, the mate plane or switch fabric is taken out of service for maintenance.

For maintenance on a single AX during an unfaulted condition, the above strategy is extended. The first step is to force all traffic to a single switch fabric in a hitless manner as described above. After a short time interval, the mate switch fabric drains and all traffic to an AX pair is sourced from a single switch fabric. The traffic through an AX and its mate aligns its delay as viewed from the LC MUX after an interval less than the maximum buffer delay on an AX. The LC MUX may then switch planes at any time in a hitless manner since the delay through an AX and its mate is equal and the traffic through each AX is equal. Once the plane switchover has occurred at the LC MUX, the RTC revisits each AX source and returns them to a symmetric mode of operation such that both planes return to service. At the port requiring maintenance, the traffic returns to symmetric mode and the AX requiring maintenance is taken out of service. All actions have occurred in a hitless manner, invisible to the customer's quality of service.

Figure 12:
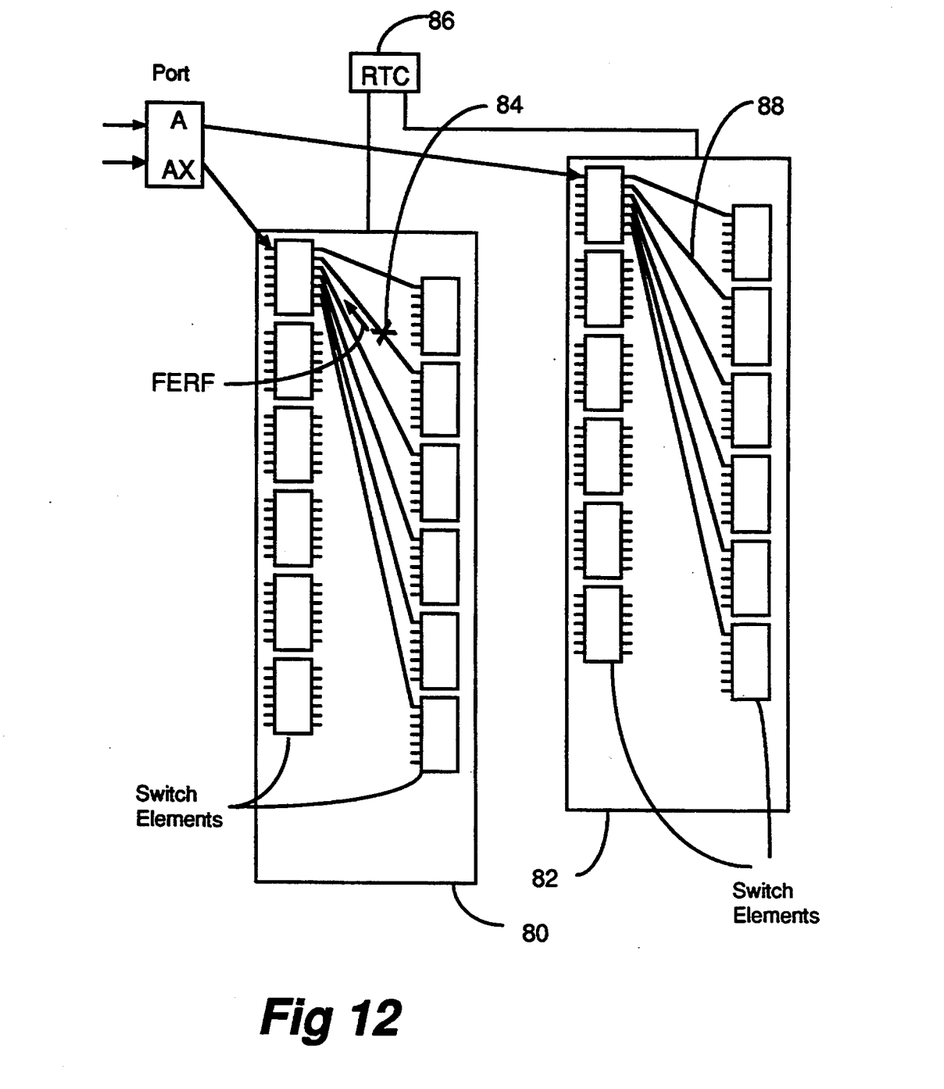
FIG. 12 is an expanded ATM switch which embodies the invention.

In FIG. 12, a further embodiment of the invention is illustrated schematically in connection with an expanded three stage switching architecture in a folded configuration. Only port A is shown. A switch fabric 80 is a three stage switch fabric in one switch plane and another switch fabric 82 is in another switch plane. When a link between stages 1 and 2, or stages 2 and 3, fails as shown by a break 84, the processing intelligence at the receiving end of the failed link inserts a FERF indication onto the link in the opposite direction in exactly the same manner as the single stage approach described above. The local intelligence receiving the FERF message informs the RTC 86 through the regular inband messaging path. This local intelligence also shuts off all traffic directed to the failed link. The RTC informs the source end of the complimentary link 88 on the duplicated plane to mark all its traffic as asymmetric. The port A receiver operates in exactly the same manner as the single stage methodology.

What is claimed is:

1. An ATM switch of dual switch plane operation for exchanging cells among a plurality of bidirectional ports through a first and a second switch plane, comprising:

each of the plurality of bidirectional ports connected to a plurality of linecards to receive the cells therefrom and transmit the cells thereto, a first and a second switch fabric for transferring the cells among the plurality of bidirectional ports, the first switch fabric being in the first switch plane and the second switch fabric being in the second switch plane, said plurality of bidirectional ports connected to first and second switch fabrics for transferring the cells among the plurality of bidirectional ports, each of the bidirectional ports having tagging means for tagging each cell either symmetric or asymmetric and having transmitting means for transmitting symmetric cells to both switch fabrics and asymmetric cells to only one of the two switch fabrics, and each of the bidirectional ports having receiving means for accepting symmetric cells from one of the two switch fabrics and asymmetric cells from either of the two switch fabrics.

2. The ATM switch of dual switch plane operation according to claim 1, wherein each bidirectional port comprises first and second multiplexers for multiplexing the cells received from the respective linecards and for sending the multiplexed cells to respective switch fabrics, and crossover connections between the first and second multiplexers for routing the cells therebetween.

3. The ATM switch of dual switch plane operation according to claim 2, wherein each of the switch fabrics has an alarm means for sending an alarm signal to a bidirectional port when it detects fault or degradation in transmission of cells transmitted from said bidirectional port.

4. The ATM switch of dual switch plane operation according to claim 3, wherein each of the bidirectional ports comprises a cell monitor provided at each multiplexer for monitoring the quality of the transmission of the cells from the respective switch fabric.

5. The ATM switch of dual switch plane operation according to claim 4, wherein each of the bidirectional ports further comprises a buffer for temporarily storing the cells received from the switch fabrics before sending them to the linecards and flow control means having means for indicating the fill state of the buffer and means for sending a flow control signal to the respective switch fabric in response to the fill state of the buffer.

6. The ATM switch of dual switch plane operation according to claim 5, further comprising a real time controller means for collecting information from the monitor on the quality of the transmission of cells and selecting one of the two switch planes as a preferred plane from which the respective bidirectional ports accept symmetric cells.

7. The ATM switch of dual switch plane operation according to claim 6, wherein the first and second switch fabrics are each multistage switches.

8. A method of exchanging ATM cells among a plurality of bidirectional ports by way of a first switch fabric in a first switch plane and a second switch fabric in a second switch plane comprising steps of:

each of the plurality of bidirectional ports receiving the cells from a plurality of linecards and transmitting the cells thereto;

each of the bidirectional ports tagging each cell either symmetric or asymmetric and transmitting symmetric cells to the switch fabric in both switch planes and asymmetric cells to the switch fabric in only one of the two switch planes; and each of the bidirectional ports accepting symmetric cells from the switch fabric in one of the two switch planes and asymmetric cells from the switch fabrics in either of the two switch planes.

9. The method of exchanging ATM cells among a plurality of bidirectional ports according to claim 8, comprising a further step of:

each of the switch fabrics sending an alarm signal to a bidirectional port when it detects fault or degradation in transmission of cells transmitted from said bidirectional port.

10. The method of exchanging ATM cells among a plurality of bidirectional ports according to claim 9, comprising further steps of:

each of the bidirectional ports monitoring the quality of the transmission of the cells from the switch fabrics in both switch planes and generating information indicative of the quality; and selecting, in response to the information, one of the two switch planes as a preferred plane from which said bidirectional ports accept symmetric cells.

11. The method of exchanging ATM cells among a plurality of bidirectional ports according to claim 10, comprising further steps of:

each of the bidirectional ports separately storing cells received from the first and second switch fabrics in a buffer, generating an indication of the fill state of the buffer and sending a flow control signal to the respective switch fabric in response to the indication.

12. The method of exchanging ATM cells among a plurality of bidirectional ports according to claim 10, comprising further steps of:

one of the bidirectional ports tagging maintenance cells and sending the tagged maintenance cells to a destination bidirectional port and the destination bidirectional port conducting a controlled switchover of the preferred switch plane in response to the tagged maintenance cells from both switch planes.

* * * * *